July 28, 1942.   J. B. GRISON   2,291,223
HEAT CONTROL FOR WELDING DEVICES
Filed Oct. 12, 1940
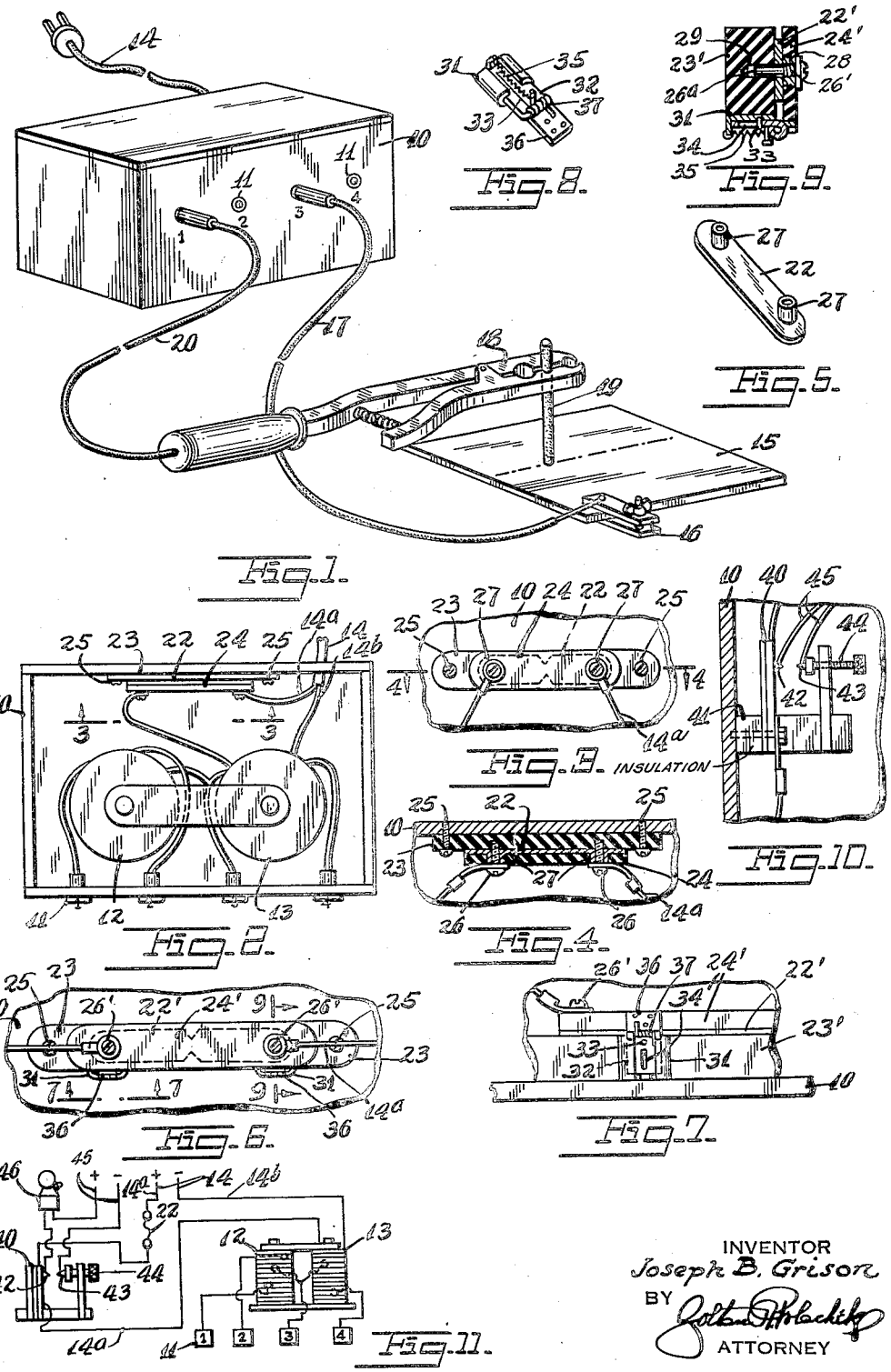
INVENTOR
Joseph B. Grison
BY
ATTORNEY Patented July 28, 1942

2,291,223

UNITED STATES PATENT OFFICE 2,291,223

HEAT CONTROL FOR WELDING DEVICES

Joseph B. Grison, Braintree, Mass.

Application October 12, 1940, Serial No. 360,886

5 Claims. (Cl. 200—133)

This invention relates to new and useful improvements in a heat control for welding devices.

The invention proposes to provide a heat control in combination with a welding device having feed lines and a power unit, and arranged in such a manner so as to prevent overheating and burning out of the power unit.

Heretofore it has been customary to construct welding devices which operate on A. C. current. These welding devices have power units. These power units may be readily short circuited if the welding device is improperly used. In the event that the electrode is allowed to remain in contact with the work for too long a period of time it becomes welded to the work. This short circuits the power unit and unless the weld is immediately broken, the power unit heats up and then burns out. This invention proposes an arrangement to overcome this deficiency.

More specifically the invention contemplates the provision of fusible material connected in series with the feed lines and adapted to burn out when the power unit heats up to a predetermined heat and so break the circuit to the welding device and prevent the burning out of the power unit.

Still further the invention proposes a novel means for removably supporting the said fusible material so that it may readily be removed and a new one replaced when it burns out.

Still further the invention contemplates the association of a thermostat with the welding device and the heat control, arranged so as to cut off the current to the welding device when a certain heat is reached. This prevents the burning out of the power unit of the welding device, and therefore does not necessitate the burning out of the fusible material. It is only when the thermostatic device does not function that the fusible material will burn out to prevent the power unit from burning out.

Still further the invention proposes that the thermostat operate a relay to sound an alarm or other signal.

Another object of this invention resides in the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a welding device with a heat control constructed in accordance with this invention.

Fig. 2 is a plan view of a portion of Fig. 1, illustrating the body of the welding device with the cover removed to show the interior parts.

Fig. 3 is a fragmentary elevational view looking in the direction of the line 3—3 of Fig. 2.

Fig. 4 is a fragmentary horizontal sectional view taken on the line 4—4 of Fig. 3.

Fig. 5 is a perspective view of the fusible material used in this invention.

Fig. 6 is a fragmentary elevational view similar to Fig. 3 but illustrating a modification of the invention.

Fig. 7 is a fragmentary elevational view looking in the direction of the line 7—7 of Fig. 6.

Fig. 8 is a perspective view of one of the hinge devices illustrated in Figs. 6 and 7.

Fig. 9 is a fragmentary vertical sectional view taken on the line 9—9 of Fig. 6.

Fig. 10 is a fragmentary sectional view of a portion of a welding device constructed in accordance with another form of this invention.

Fig. 11 is a schematic wiring diagram of the welding device with the heat controls constructed in accordance with the form of the invention illustrated in Fig. 10.

In Figs. 1 and 2 a conventional arc welding device has been illustrated to which the invention has been applied. This welding device comprises the usual body 10 having several terminals 11 mounted on the front wall thereof. These terminals are numbered 1 to 4 inclusive. These terminals are connected with the usual coils 12 and 13 located within the body. A cable 14 which is adapted to be plugged into an electric socket of an electric circuit, is connected with the coils in the usual fashion. The leads 14a and 14b of the cable 14 comprise feed lines to the power unit.

Reference numeral 15 illustrates the work to be welded. The usual ground clamp 16 is mounted upon this work and is connected by the usual ground cable 17 to one of the terminals on the body 10. The usual electrode holder 18 for holding an electrode 19, is connected by a cable 20 to another one of the terminals of the body 10. The welder has a choice of connecting the ground cable 17 and the electrode holder cable 20 in a certain combination with the terminals 11 depending upon the heat he desires. The particular combinations are supplied by the manufacturer of the welding device. For example, in one design of welder, to obtain a low heat the electrode cable 20 is connected with terminal 1 and the ground cable 17 with terminal 3. Medium heat may be obtained by connecting the cable 20 with terminal 1 and the ground cable 17 with terminal 4. A high heat may be obtained by connecting the electrode cable 20 with terminal 2 and connecting the ground cable 17 with terminal 3. A very high heat may be obtained by connecting the electrode cable 20 with terminal 2 and the ground cable 17 with terminal 4. In this particular type of welder the manufacturer cautions against using any other combinations.

In accordance with this invention, fusible material 22 is connected in series with one of the feed lines of the cable 14. It is shown connected in series with the lead 14ᵃ. The fusible material 22 may comprise a strip of fusible metal. It is designed to fuse when the welding device reaches a certain temperature. It may fuse due to the heat of the current passing through the circuit, and due to the internal heat developed within the body 10.

The fusible material 22 is clamped in between a pair of insulation strips 23 and 24. The strip 23 is mounted upon one wall of the body 10 by several fastening elements 25. The strip 24 is mounted on the strip 23 by fastening elements 26. These fastening elements 26 pass through lugs 27 formed on the fusible material 22. These lugs 27 engage through openings formed in the strip 24. The fastening elements 26 comprise terminals for receiving the ends of the sections of the lead 14ᵃ.

The welding unit is used in the usual way. However, if the power unit thereof overheats, the fusible material 22 will burn out before the power unit does. This saves the welding device.

In Figs. 6 to 9 inclusive a modified form of the invention has been disclosed which distinguishes from the prior form in the means for removably supporting the fusible material. In accordance with this form of the invention the fusible material 22' is supported by several fastening elements 26' which are mounted upon the front strip 24'. More specifically the fastening elements 26' are mounted in bushings 28 which in turn are mounted on the strips 24'. These bushings 28 are of metallic material and bear against the fusible material 22' to make a good contact. The inner ends 26ᵃ of the fastening elements 26 extend into openings 29 formed in the insulation strip 23'. This strip is adapted to be mounted on the wall of the welding device by fastening elements 25.

The strip 24' is supported by combination slide and hinge devices. There are two such devices located at the ends of the strip 24'. Each of these devices includes a bracket 31 fixedly mounted on the strip 23'. This bracket 31 slidably supports a slide leaf 32. A pin 33 is mounted on the bracket 31 and extends through a slot 34 in the slide leaf 32 to prevent accidental disengagement of these parts. However, the slide leaf 32 is capable of moving from an inward position as illustrated in Fig. 9 to an extended position. A spring 35 is connected between the slide 32 and the bracket 31 and normally acts to resiliently hold the slide leaf 32 in a retracted position. Another leaf 36 is pivotally mounted upon the outer end of the slide leaf 32. This leaf 36 is connected with the edge of the strip 24' and serves to support the strip. A spring 37 is coaxially mounted upon the hinge point of the slide leaf 32 and the leaf 36 and acts to normally urge the leaf 36 into a position in which the strip 24' is urged against the fusible material 22'.

In other respects this form of the invention is identical to the previous form and identical parts may be recognized by identical reference numerals. Its operation is substantially the same. However, when the fusible material 22' burns out it may readily be replaced in the following way: The strip 24' should be manually gripped and pulled outwards so as to extend the slide leaf 32 a short distance, then the strip 24' is free to be pivoted downwards. This exposes the remaining portions of the fusible material 22'. These portions are now removed. Then a new piece of fusible material is placed in position and the parts are allowed to assume their original positions. The device is now ready to use again.

In Figs. 10 and 11 another modified form of the invention has been disclosed which distinguishes from the prior forms in the fact that a thermostat and relay control has been provided to cut off the circuit to the power unit when a predetermined temperature is reached. This thermostat and relay is used in conjunction with a fusible material previously described. The thermostat comprises a strip of bi-metal material 40 which is supported at one end on an insulation block 41. This bi-metal material 40 is connected in one of the feed lines of the welding device, namely the feed line 14ᵃ. It is connected in series with the fusible material 22 schematically illustrated in Fig. 11.

The bi-metal strip 40 carries a contact 42 which is cooperative with a complementary contact 43 mounted on an adjustable support 44. This adjustable support 44 is capable of controlling the distance between the contacts 42 and 43. This adjustment permits a selection of temperature for the thermostatic control. The contacts 42 and 43 are connected in an auxiliary circuit 45 which includes an alarm 46, or other signal device. The arrangement is such that when the thermostat heats up to a predetermined heat, the contacts 42 and 43 will engage each other closing the circuit 45 and sounding, or in any other way operating the signal 46. This warns the operator that the power unit is being overheated.

If the operator stops the overheating, the fusible material 22 will not burn out. The thermostat then cools off. The alarm 46 stops operating and the device is ready to be used again. Only in such instances where the operator does not stop the overheating when the signal functions, does the fusible material burn out.

In other respects the operation of this form of the invention is identical to the previous form and it is believed the operation will be readily understood.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a fuse for a power line, a back strip of insulation material fixedly mounted on a support and formed with spaced openings, a front strip of insulation material, pins extended through said front strip in aligned positions with said openings and having their ends projected beyond the back face of said front strip and into said openings, electric leads connected to said pins adjacent the front face of said front strip, a piece of fusible material disposed between the adjacent faces of said strips and engaged over said pins connecting said pins together to complete an electric circuit, and means supporting said front strip on said back strip so that said front strip may be pulled away from said back strip to expose said fusible material to be changed when it burns out, comprising hinges having one of their leaves securely attached to the bottom edge of said front strip, tracks fixedly mounted on the bottom edge of said rear strip and into which the free leaves of said hinges slidably extend, means operating between the leaves of said hinges urging said front strip into a position parallel to said back strip, and means operating between said tracks and the leaves they slidably support to urge said front strip towards said back strip, whereby said front may be gripped and pulled outwards to disengage the rear ends of said pins from the openings in said back strip after which said front strip may be pivoted downwards to expose said fusible material.

2. In a fuse for a power line, a back strip of insulation material fixedly mounted on a supoprt and formed with spaced openings, a front strip of insulation material, pins extended through said front strip in aligned positions with said openings and having their ends projected beyond the back face of said front strip and into said openings, electric leads connected to said pins adjacent the front face of said front strip, a piece of fusible material disposed between the adjacent faces of said strips and engaged over said pins connecting said pins together to complete an electric circuit, and means supporting said front strip on said back strip so that said front strip may be pulled away from said back strip to expose said fusible material to be changed when it burns out, comprising hinges having one of their leaves securely attached to the bottom edge of said front strip, tracks fixedly mounted on the bottom edge of said rear strip and into which the free leaves of said hinges slidably extend, means operating between the leaves of said hinges urging said front strip into a position parallel to said back strip, and means operating between said tracks and the leaves they slidably support to urge said front strip towards said back strip, whereby said front strip may be gripped and pulled outwards to disengage the rear ends of said pins from the openings in said back strip after which said front strip may be pivoted downwards to expose said fusible material, said first-means, comprising springs wound coaxially on the pivots of said hinge leaves and having their ends bearing against the bottom faces of said leaves.

3. In a fuse for a power line, a back strip of insulation material fixedly mounted on a support and formed with spaced openings, a front strip of insulating material, pins extended through said front strip in aligned positions with said openings and having their ends projected beyond the back face of said front strip and into said openings, electric leads connected to said pins adjacent the front face of said front strip, a piece of fusible material disposed between the adjacent faces of said strips and engaged over said pins connecting said pins together to complete an electric circuit, and means supporting said front strip on said back strip so that said front strip may be pulled away from said back strip to expose said fusible material to be changed when it burns out, comprising hinges having one of their leaves securely attached to the bottom edge of said front strip, tracks fixedly mounted on the bottom edge of said rear strip and into which the free leaves of said hinges slidably extend, means operating between the leaves of said hinges urging said front strip into a position parallel to said back strip, and means operating between said tracks and the leaves they slidably support to urge said front strip towards said back strip, whereby said front strip may be gripped and pulled outwards to disengage the rear ends of said pins from the openings in said back strip after which said front strip may be pivoted downwards to expose said fusible material, said latter means, comprising spaced pins extending from said tracks and said hinges, and contraction springs operating between adjacent pairs of pins urging said hinges rearwards.

4. In a fuse for a power line, a back strip of insulation material fixedly mounted on a support and formed with spaced openings, a front strip of insulation material, pins extended through said front strip in aligned positions with said openings and having their ends projected beyond the back face of said front strip and into said openings, electric leads connected to said pins adjacent the front face of said front strip, a piece of fusible material disposed between the adjacent faces of said strips and engaged over said pins connecting said pins together to complete an electric circuit, and means supporting said front strip on said back strip so that said front strip may be pulled away from said back strip to expose said fusible material to be changed when it burns out, comprising hinges having one of their leaves securely attached to the bottom edge of said front strip, tracks fixedly mounted on the bottom edge of said rear strip and into which the free leaves of said hinges slidably extend, means operating between the leaves of said hinges urging said front strip into a position parallel to said back strip, and means operating between said tracks and the leaves they slidably support to urge said front strip towards said back strip, whereby said front strip may be gripped and pulled outwards to disengage the rear ends of said pins from the openings in said back strip after which said front strip may be pivoted downwards to expose said fusible material, and means on said tracks engaging the leaves of said hinges supported thereby preventing complete disengagement of said leaves from said tracks.

5. In a fuse for a power line, a back strip of insulation material fixedly mounted on a support and formed with spaced openings, a front strip of insulation material, pins extended through said front strip in aligned positions with said openings and having their ends projected beyond the back face of said front strip and into said openings, electric leads connected to said pins adjacent the front face of said front strip, a piece of fusible material disposed between the adjacent faces of said strips and engaged over said pins connecting said pins together to complete an electric circuit, and means supporting said front strip on said back strip so that said front strip may be pulled away from said back strip to expose said fusible material to be changed when it burns out, comprising hinges having one of their leaves securely attached to the bottom edge of said front strip, tracks fixedly mounted on the bottom edge of said rear strip and into which the free leaves of said hinges slidably extend, means operating between the leaves of said hinges urging said front strip into a position parallel to said back strip, and means operating between said tracks and the leaves they slidably support to urge said front strip towards said back strip, whereby said front strip may be gripped and pulled outwards to disengage the rear ends of said pins from the openings in said back strip after which said front strip may be pivoted downwards to expose said fusible material, and means on said tracks engaging the leaves of said hinges supported thereby preventing complete disengagement of said leaves from said tracks, said latter means, comprising pins extending from said tracks and engaging elongated slots formed in said leaves.

JOSEPH B. GRISON.